US012498290B2

(12) United States Patent
Hofmann

(10) Patent No.: US 12,498,290 B2
(45) Date of Patent: Dec. 16, 2025

(54) METHOD FOR DETERMINING AND/OR ANALYZING A LEAK IN A LINE FOR LIQUID MEDIA, IN PARTICULAR A WATER LINE

(71) Applicant: Megger Germany GmbH, Baunach (DE)

(72) Inventor: Michael Hofmann, Braunach (DE)

(73) Assignee: Megger Germany GmbH, Baunach (DE)

( * ) Notice: Subject to any disclaimer, the term of this patent is extended or adjusted under 35 U.S.C. 154(b) by 295 days.

(21) Appl. No.: 18/323,266

(22) Filed: May 24, 2023

(65) Prior Publication Data

US 2024/0053222 A1 Feb. 15, 2024

(30) Foreign Application Priority Data

May 25, 2022 (DE) ...................... 10 2022 113 311.7

(51) Int. Cl.
*G01M 3/24* (2006.01)
(52) U.S. Cl.
CPC .................................... *G01M 3/243* (2013.01)
(58) Field of Classification Search
CPC ........... G01M 3/00; G01M 3/24; G01M 3/243
See application file for complete search history.

(56) References Cited

U.S. PATENT DOCUMENTS

| 8,964,509 | B2 * | 2/2015 | Hermann | ................ | G01M 3/24 |
| | | | | | 367/199 |
| 9,970,840 | B2 * | 5/2018 | Shinoda | .................... | F17D 5/06 |
| 10,036,684 | B2 * | 7/2018 | Kinoshita | ............... | G01M 3/26 |
| 2018/0045687 | A1 * | 2/2018 | Tominaga | ............... | E03B 7/071 |
| 2021/0055153 | A1 * | 2/2021 | Forster-Knight | ....... | G01M 3/28 |
| 2022/0349773 | A1 * | 11/2022 | Kristensen | .............. | E03B 7/072 |

FOREIGN PATENT DOCUMENTS

| DE | 102005033491 | | 1/2007 | | |
| DE | 102010023776 | | 12/2011 | | |
| EP | 2097728 | B1 * | 11/2016 | ............ | G01M 3/243 |
| GB | 2369677 | A * | 6/2002 | ............ | G01M 3/243 |

(Continued)

OTHER PUBLICATIONS

EP-2097728 B1 Machine Translation (Year: 2016).*

(Continued)

*Primary Examiner* — Nguyen Q. Ha
(74) *Attorney, Agent, or Firm* — Workman Nydegger

(57) ABSTRACT

A method for determining a leak in a line for fluid media can include providing at least one noise and/or frequency logger comprising a sensor, and a computing unit, attaching the noise and/or frequency logger to the line or to fittings thereof, measuring noise on the line via the sensor and determining a noise level by means of a frequency analysis of the noise level. The determined frequency spectrum may be divided into two or more frequency bands, and a threshold value may be determined for each frequency band. A threshold value can be determined for each frequency band, and compare the measured noise to determine if one or more threshold values are being exceeded. A leak in the line can thus be determined and/or analyzed by means of the computing unit.

18 Claims, 1 Drawing Sheet

(56) References Cited

FOREIGN PATENT DOCUMENTS

| JP | 10-281921 A | 10/1998 | | |
|---|---|---|---|---|
| WO | 2008/081148 A2 | 7/2008 | | |
| WO | WO-2010094809 A1 * | 8/2010 | ............. | G01F 1/666 |
| WO | WO-2015145972 A1 * | 10/2015 | ............ | G01M 3/243 |

OTHER PUBLICATIONS

WO-2015145972 Machine Translation (Year: 2015).*
European Search Report received for EP Patent Application No. 23020237.6, mailed on Nov. 18, 2023, 9 pages. (English version not available).

* cited by examiner

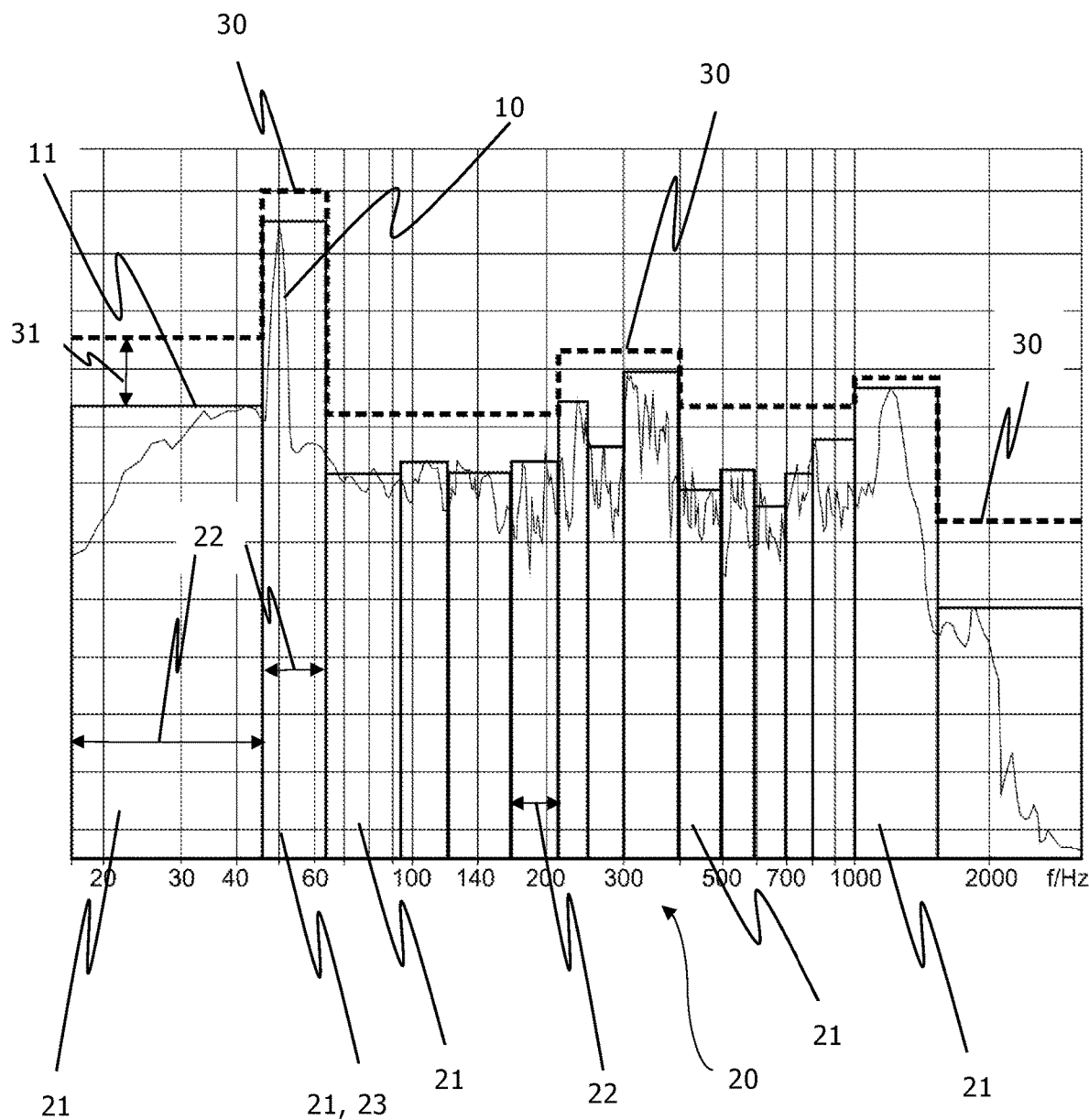

METHOD FOR DETERMINING AND/OR ANALYZING A LEAK IN A LINE FOR LIQUID MEDIA, IN PARTICULAR A WATER LINE

CROSS-REFERENCE TO RELATED APPLICATIONS

The present invention claims priority to German Application No. 10 2022 113 311.7, filed on May 25, 2022, the entire content of which is incorporated herein by reference.

BACKGROUND OF THE INVENTION

1. Field of the Invention

The invention relates to a method for determining and/or analyzing a leak in a line for fluid media, in particular a water line, particularly preferably a drinking water line, for example an underground drinking water line.

2. The Relevant Technology

Noise and/or frequency loggers are typically used to locate leakage points in a pipe network. These noise and/or frequency loggers can be used at many measuring points and detect leakage noises by determining the noises generated by leakages at provided measuring intervals, and processing this signal. Typically, such noise and/or frequency loggers are attached directly to the lines for liquid media, in particular the water lines, particularly preferably the drinking water lines, or to fittings of the lines, such as line gate valves, house gate valves or underground or above-ground hydrants.

A leak in a line results in a pressure fluctuation at the leakage point. This pressure fluctuation generates a vibration at the leakage point, which vibration propagates through the line and can be recorded with sensitive sensors, such as microphones or piezo sensors. By analyzing the noise data, a leak in the line can be inferred. A line without leakage does not cause any audible pressure fluctuations. The noise sensors are generally placed on a slide valve rod which is mechanically connected to the line. Often, it is not just the pure noises generated by a leak that are recorded, but also different interference noises. These interference noises are caused by pumping or buzzing from electrical devices, for example transformer stations, substation units, air conditioning systems, etc. The audio signal recorded by the sensor therefore usually consists of a mixture of leakage noise and interference noise.

BRIEF SUMMARY OF THE INVENTION

The object of the invention is therefore to present a new method, in particular a method by means of which interference noises can be distinguished at least as much as possible from leakage noise, for determining and/or analyzing a leak in a line for fluid media, in particular a water line.

This object is achieved by a method for determining and/or analyzing a leak in a (pipe) line for fluid media, in particular a water line, according to the features of claim 1. Advantageous embodiments and further developments are provided in the dependent claims.

The method according to the invention comprises the following steps:
a) providing at least one noise and/or frequency logger comprising a sensor and a computing unit,
b) attaching the noise and/or frequency logger to the line or to fittings of the line,
c) measuring noise in the line via the sensor and determining a noise level by means of the computing unit,
  c1) a frequency analysis, in particular a Fourier analysis, preferably a fast Fourier transform, of the noise level for determining a frequency spectrum being carried out by means of the computing unit,
  c2) the determined frequency spectrum being divided into two or more frequency bands by means of the computing unit,
  c3) a threshold value being determined by means of the computing unit, in particular individually, for each frequency band, and/or being stored in the computing unit that is greater than the maximum noise level in this frequency band during a measurement of the leak-free line,
  c4) wherein, based on one or more threshold values being exceeded, a leak in the line can be determined and/or analyzed or is determined and/or analyzed by means of the computing unit.

The sensor preferably is or comprises a noise sensor and/or a piezo sensor and/or a piezo microphone, in particular for measuring a noise by means of the vibration and/or the structure-borne sound in the line wall, and/or a hydrophone for directly measuring the noise in the water column.

The threshold values stored in the computing unit can be adjustable and/or adaptable or can be set and/or adjusted by a user. Furthermore, the threshold values can also be automatically set and/or adjusted by algorithms and/or artificial intelligence.

The advantages of the invention are in particular that improved differentiation between leakage noises and interference noises is possible with the method according to the invention. With the method according to the invention, in addition to the pure signal level, the frequency components of the signal are evaluated. The high frequency components are weakened by the damping through the pipe. The closer the sensor is positioned to the leak, the more high frequency components are included. Low frequency components are still perceptible over a long distance. Typical leakage noises are frequently broadband within a frequency range of 150-600 Hz. Interference noises by the power grid are usually found as narrowband frequencies in 50/60 Hz and 100/120 Hz. In known leakage methods, an evaluation of whether or not a leak is present is carried out primarily using the noise level and by evaluating a single significant frequency value of the recorded noise. However, this is problematic as soon as an interference noise generates a higher noise level than the leakage noise itself. By means of the invention, it is possible to draw conclusions as to whether the noise was mainly caused by a leak or by a grid disturbance from the evaluation of the frequency value. By setting the threshold values for each frequency band, frequencies in which interferences frequently occur can be ignored.

The spectrum of the leakage noise is calculated using an FFT (fast Fourier transform/frequency analysis) and is composed of a relatively large number of values (e.g., 4096). Because this is a large amount of data for one sensor, it makes sense to reduce the data, in particular to 4 to 128 frequency bands, for example to 16 frequency bands. This allows the transmission time and therefore current and data volume to be reduced. However, the range can also be selected to be larger. It could also be, for example, 2 to 4096 frequency bands. The reduction is primarily carried out to reduce the amount of data.

According to a preferred embodiment of the invention, a provided number of frequency bands is set by means of the computing unit and/or is stored in the computing unit, wherein between 4 and 128 frequency bands, particularly preferably 16 frequency bands, are provided.

It can be provided that the set and/or stored threshold value of each frequency band is between 1% and 100% greater than the maximum noise level in this frequency band during a measurement of the leak-free line.

Furthermore, it can be provided that the distance between the threshold value of each frequency band and the maximum noise level in this frequency band during a measurement of the leak-free line is set individually for each frequency band by means of the computing unit and/or is stored in the computing unit.

According to a further development of the invention, the distance in a frequency band in frequency ranges of interference noises that are known and/or stored in the computing unit is set greater than the distance in a frequency band in frequency ranges without interference noises that are known and/or stored in the computing unit.

It is preferably provided that the threshold value of the frequency bands in frequency ranges in which the noise level increases typically occur due to leakage noises, i.e., in particular the threshold value of the frequency bands in the frequency range of 150 Hz to 600 Hz is typically set by the computing unit and/or stored in the computing unit as not as high above the maximum noise level in these frequency bands during a measurement of the leak-free line than the threshold value of the frequency bands in the frequency range below 100 Hz and/or above 800 Hz.

The width of the frequency bands can be individually set by the computing unit and/or stored in the computing unit.

It can be provided that the width of the frequency bands set or provided in the frequency range of typical leakage noises, i.e., in particular in the frequency range of 150 Hz to 600 Hz, is not as large as the width of the frequency bands set or provided in the useful range, in particular in the frequency range below 100 Hz and/or above 800 Hz.

Furthermore, it can be provided that the width of the frequency bands in frequency ranges of interference noises that are known and/or stored in the computing unit, in particular in the frequency range below 100 Hz and/or above 800 Hz is selected to be not as large as the width of the frequency bands are on average in the frequency range below 100 Hz and/or above 800 Hz.

According to one embodiment of the invention, a warning signal is generated by the computing unit when a threshold value is exceeded, the warning signal being processed in particular by the computing unit and/or a central computing unit in order to detect or analyze a leak.

Optionally, each warning signal receives a weighting by the computing unit, the weighting being dependent on the frequency band in which the threshold value is exceeded. Furthermore, the percentage by which the threshold value is exceeded and/or the threshold value being repeatedly exceeded can also be included or calculated in the weighting.

Preferably, the weighting of exceeding the threshold value for the frequency bands in the frequency range of 150 Hz to 600 Hz is higher than the weighting of exceeding the threshold value for the frequency bands in the frequency range below 100 Hz and/or above 800 Hz.

It can be provided that the computing unit outputs an alarm message or transmits it to a central computing unit if one or more warning signals are generated.

It can also be provided that the computing unit outputs an alarm message or transmits it to a central computing unit, provided that after weighting the generated warning signals, a provided total weighting value is reached or exceeded. The total weighting value can be a measure of the leakage probability. The more threshold values are exceeded and/or the higher the weighting of the corresponding frequency bands, the greater the probability that a leak is present.

One embodiment of the invention provides that a plurality of noise and/or frequency loggers are arranged, in particular at provided distances, on the line for fluid media, in particular the water line or on fittings of the line, each noise and/or frequency logger performing the following steps:

c) measuring noise on the line via the sensor and determining a noise level by means of the computing unit, c1) a frequency analysis, in particular a Fourier analysis, of the noise level for determining a frequency spectrum being carried out by means of the computing unit, c2) the determined frequency spectrum being divided into two or more frequency bands by means of the computing unit, c3) a threshold value being determined by means of the computing unit, in particular individually, for each frequency band, and/or being stored in the computing unit that is greater than the maximum noise level in this frequency band during a measurement of the leak-free line, c4) wherein, based on one or more threshold values being exceeded, a leak in the line can be determined and/or analyzed or is determined and/or analyzed by means of the computing unit.

According to a further development, the computing units of the noise and/or frequency loggers transmit alarm messages to a central computing unit, in particular in the case of a leak, for example by means of a cloud, each alarm message comprising the noise level and the frequency of the noise level when the threshold value is exceeded.

Provision can be made for the alarm messages, in particular alarm messages of a plurality of computing units, to be calculated with one another by the central computing unit in order to detect a leak and/or to analyze it, in particular with respect to the size and/or position of the leak.

Furthermore, it can be provided that the position of each of the noise and/or frequency loggers and the line characteristic of the line, in particular of the water line, is stored in the central computing unit, and the central computing unit determines the size and/or position of the leak on the basis of the position of the noise and/or frequency loggers and the line characteristic and the alarm messages.

The noise and/or frequency loggers can, for example, be positioned at a spacing of 50-200 m along the line. The closer the sensor is to the leakage, the better the leakage noise can be detected and expressed at a high signal level (loudness of the noise). The signal level is likewise higher, the larger the leak. In particular, more high frequency components are also contained in the signal.

BRIEF DESCRIPTION OF THE DRAWINGS

The invention is explained in more detail below also with regard to further features and advantages on the basis of the description of an exemplary embodiment and with reference to the accompanying schematic drawing.

FIG. 1 shows by way of example a frequency spectrum of a noise level which is divided into a plurality of frequency bands according to the method according to the invention, and wherein a threshold value is set for each frequency band.

DETAILED DESCRIPTION

The method according to the invention is provided for determining and/or analyzing a leak in a line for fluid media. By way of example, reference is made below to water lines, in particular drinking water lines. According to the method according to the invention, at least one noise and/or frequency logger, which comprises a sensor for measuring a noise, and a computing unit is provided first in a step a).

According to a step b), the noise and/or frequency logger is attached to a water line, in particular a drinking water line, or to a fitting of the water line, for example a slide valve rod, which is mechanically connected to the water line.

In a step c), the noise in the water line is measured by the sensor, and a noise level 10 is determined by means of the computing unit.

By means of the computing unit, a frequency analysis, in particular a Fourier analysis, for example a fast Fourier transform, of the noise level 10 is performed in a step c1) to determine a frequency spectrum 20. This frequency spectrum 20 is shown in FIG. 1.

In a step c2), the determined frequency spectrum 20 is divided into 16 frequency bands 21 by means of the computing unit. The division into 16 frequency bands is preset. The width 22 of these frequency bands 21 is set individually for each frequency band 21 by means of the computing unit. The provided width 22 of the frequency bands 21 can be stored in the computing unit for this purpose. The width 22 of the frequency bands 21 set or provided in the frequency range of 150 Hz to 600 Hz is not set as large as the width 22 of the frequency bands 21 set or provided in the frequency range below 100 Hz and/or above 800 Hz. This is based on the fact that leakage noises typically occur in the frequency range of 150 Hz to 600 Hz and are to be detected particularly efficiently there. In addition, the width 22 of the frequency bands 23 in frequency ranges of interference noises that are known and stored in the computing unit, in particular in the frequency range below 100 Hz and/or above 800 Hz, is set to be not as large on average as the width 22 of the frequency bands in the frequency range below 100 Hz and/or above 80 Hz.

According to a step c3), a threshold value 30 is set individually for each of the 16 frequency bands by means of the computing unit. This can be stored, for example, in the computing unit. The threshold value 30 of each frequency band 21 is greater than the maximum noise level 11 in this frequency band 21 during a measurement of the leak-free water line. The threshold value 30 of the frequency bands 21 in the frequency range of 150 Hz to 600 Hz is also set by means of the computing unit 11 to be not as high above the maximum noise level in these frequency bands 21 during a measurement of the leak-free water line than the threshold value 30 of the frequency bands 21 in the frequency range below 100 Hz and/or above 800 Hz. This is based on the fact that leakage noises typically occur in the frequency range of 150 Hz to 600 Hz and are to be detected particularly efficiently there.

With the individual setting of the threshold value 30, also the distance 31 of the threshold value 30 of each frequency band 21 from the maximum noise level 11 is individually set in this frequency band 21 for each frequency band 21 by means of the computing unit, the distance 31 in a frequency band 23 in frequency ranges of interference noises that are known and stored in the computing unit being set greater than the distance in a frequency band 21 in frequency ranges without known interference noises. In this way, the "fineness" of the threshold value 30 can be adapted, the threshold value in frequency bands 21 in which known interference noises are possible or present being less finely adjusted in order to at least predominantly avoid a warning signal being caused by interference noises.

In a step c4), based on one or more threshold values 30 being exceeded, a leak in the water line is detected and/or analyzed by means of the computing unit. When a threshold value is exceeded 30, a warning signal is generated by the computing unit, the warning signal being processed in particular by the computing unit or a central computing unit in order to detect or analyze a leak.

It can be provided that each warning signal receives a weighting via the computing unit, the weighting being dependent on the frequency band 21 in which the threshold value 30 is exceeded. Furthermore, the percentage by which the threshold value 30 is exceeded and/or the threshold value 30 being repeated exceeding can also be incorporated or calculated into the weighting. The weighting of exceeding the threshold value 30 for the frequency bands 21 in the frequency range of 150 Hz to 600 Hz is higher than the weighting of exceeding the threshold value 30 for the frequency bands 21 in the frequency range below 100 Hz and/or above 800 Hz. This is based on the fact that leakage noises typically occur in the frequency range of 150 Hz to 600 Hz and are to be detected particularly efficiently there.

The computing unit outputs an alarm message or transmits an alarm message to a central computing unit if either one or a plurality of warning signals are generated or, after weighting of the generated warning signals, a provided total weighting value is reached or exceeded.

A further development of the method provides that a plurality of noise and/or frequency loggers are arranged at provided distances, e.g., 50 m-200 m on the water line or on fittings of the water line, each noise and/or frequency logger performing steps c) to c4).

The computing units of the noise and/or frequency loggers transmit an alarm message to a central computing unit on the basis of the criteria described above and/or in the event of a leak, each alarm message comprising the noise level 10 and the frequency of the noise level 10 when the threshold value 30 is exceeded. The alarm messages are calculated together by the central computing unit in order to determine a leak and to analyze it with respect to the size and position of the leak. The position of each of the noise and/or frequency loggers and the line characteristic of the water line are stored in the central computing unit, and the central computing unit determines the size and position of the leak on the basis of the position of the noise and/or frequency loggers and of the line characteristic as well as the alarm messages.

LIST OF REFERENCE SIGNS 10 noise level
11 maximum noise level
20 frequency spectrum
21 frequency band
22 width
23 frequency band in frequency range of known noise variable
30 threshold value
31 distance

I claim:

1. A method for determining and/or analyzing a leak in a line for fluid media, in particular a water line, the method comprising the steps of:
   a) providing at least one noise and/or frequency logger comprising a sensor, and a computing unit,
   b) attaching the at least one noise and/or frequency logger to the line or to a fitting of the line,
   c) using the sensor and the computing unit to detect noise and determine a noise level on the line, wherein
   c1) the computing unit performs a frequency analysis of the noise level to determine a frequency spectrum thereof,
   c2) the computing unit divides the determined frequency spectrum into two or more frequency bands,
   c3) the computing unit determines and/or stores, for each respective frequency band, a threshold value that is greater than a maximum noise level in each respective frequency band during a noise detection on the line when the line is leak free, and
   c4) the computing unit determines and/or analyzes a leak in the line when the determined noise level exceeds one or more threshold values.

2. The method according to claim 1, wherein:
in step c2), the computing unit sets and/or stores a number of frequency bands to be between 4 and 128 frequency bands, preferably 16 frequency bands.

3. The method according to claim 1, wherein:
the determined and/or stored threshold value for each respective frequency band is between 1% and 100% greater than the maximum noise level in each respective frequency band during a noise detection on the line when the line is leak free.

4. The method according to claim 1, wherein:
the computing unit sets an amplitude distance between the threshold value and the maximum noise level in each respective frequency band individually; and/or stores the amplitude distance individually during a noise detection on the line when the line is leak free for each respective frequency band.

5. The method according to claim 1, wherein:
the computing unit sets an amplitude distance between the threshold value and the maximum noise level in frequency bands having interference noises that are known and/or stored in the computing unit to be greater than an amplitude distance between the threshold value and the maximum noise level in frequency bands having no interference noises that are known or stored in the computing unit.

6. The method according to claim 1, wherein the computing unit sets and/or stores the threshold value for frequency bands in a frequency range of 150 Hz to 600 Hz not to be as high above the maximum noise level in these frequency bands during a noise detection on the line when the line is leak free as compared to the threshold value for frequency bands in a frequency range below 100 Hz and/or above 800 Hz.

7. The method according to claim 1, wherein:
the computing unit sets and/or stores a width of a respective frequency band individually.

8. The method according to claim 1, wherein:
the computing unit sets or provides a width of a frequency band in a frequency range of 150 Hz to 600 Hz to be narrower than a width of a frequency band in a frequency range below 100 Hz and/or above 800 Hz.

9. The method according to claim 1, wherein:
the computing unit sets or selects a width of a frequency band in frequency ranges of interference noises that are known and/or stored in the computing unit to be narrower on average than a width of a frequency band in a frequency range below 100 Hz and/or above 800 Hz.

10. The method according to claim 1, wherein:
when the determined noise level exceeds one or more threshold values, the computing unit generates respective one or more warning signals.

11. The method according to claim 10, wherein:
the computing unit gives each warning signal a weighting, the weighting being dependent on a frequency band in which the threshold value is exceeded.

12. The method according to claim 11, wherein:
the weighting for a frequency band in a frequency range of 150 Hz to 600 Hz is higher than the weighting for a frequency band in a frequency range below 100 Hz and/or above 800 Hz.

13. The method according to claim 10, wherein:
the computing unit outputs an alarm message or transmits the alarm message to a central computing unit when the one or more warning signals are generated.

14. The method according to claim 13, wherein:
the computing unit outputs the alarm message or transmits the alarm message to a central computing unit if, after weighting the generated warning signals, and determining that a total weighting value reaches or exceeds a predetermined weighting value.

15. The method according to claim 1, wherein:
a plurality of the noise and/or frequency loggers are arranged on the line or on fittings of the line and in communication with the computing unit, wherein the computing unit performs steps c) to c4) in association with each of the noise and/or frequency loggers.

16. The method according to claim 15, wherein:
a computing unit of each of the noise and/or frequency loggers transmits an alarm message to a central computing unit, each alarm message comprising a noise level and a frequency of the noise level when a determined noise level exceeds one or more threshold values.

17. The method according to claim 16, wherein:
the central computing unit calculates the alarm messages together to further determine and/or analyze the leak.

18. The method according to claim 16, wherein:
the central computing unit stores a position of each of the noise and/or frequency loggers and characteristic of the line, and
the central computing unit determines a size and/or position of the leak on a basis of the position of each of the noise and/or frequency loggers and of the characteristic of the line as well as the alarm messages.

* * * * *